United States Patent [19]
Devarakonda et al.

[11] Patent Number: 5,454,108
[45] Date of Patent: Sep. 26, 1995

[54] DISTRIBUTED LOCK MANAGER USING A PASSIVE, STATE-FULL CONTROL-SERVER

[75] Inventors: Murthy Devarakonda, Ossining; Ajay Mohindra, Tarrytown, both of N.Y.

[73] Assignee: International Business Machines Corporation, Armonk, N.Y.

[21] Appl. No.: 187,432

[22] Filed: Jan. 26, 1994

[51] Int. Cl.$^6$ .................................................. G06F 15/167
[52] U.S. Cl. ................................... 395/650; 364/DIG. 1; 364/246.8; 364/281.8; 364/228.1
[58] Field of Search ..................................... 395/650, 600

[56] References Cited

U.S. PATENT DOCUMENTS

| | | | |
|---|---|---|---|
| 4,716,528 | 12/1987 | Crus et al. | 364/DIG. 1 |
| 4,965,719 | 10/1990 | Shoens et al. | 364/DIG. 1 |
| 5,063,502 | 11/1991 | Jordan, Jr. | 364/DIG. 1 |
| 5,063,504 | 11/1991 | Jordan, Jr. | 364/DIG. 1 |
| 5,161,227 | 11/1992 | Dias et al. | 364/DIG. 1 |
| 5,175,837 | 12/1992 | Arnold et al. | 364/DIG. 1 |
| 5,202,971 | 4/1993 | Henson et al. | 364/DIG. 1 |
| 5,210,848 | 5/1993 | Liu | 364/DIG. 1 |
| 5,226,143 | 7/1993 | Baird et al. | 364/DIG. 1 |
| 5,226,159 | 7/1993 | Henson et al. | 364/DIG. 1 |
| 5,319,780 | 6/1994 | Catino et al. | 364/DIG. 1 |

OTHER PUBLICATIONS

"Token Ring–Based Distributed Lock Manager", D. M. Dias and B. R. Iyer, IBM Technical Disclosure Bulletin, vol. 30, No. 7, Dec. 1987.

"Index Mini–Pages", R. A. Crus, T. R. Malkemus and G. R. Putzolu, IBM Technical Disclosure Bulletin, vol. 25, No. 11A, Apr. 1983.

"Multilevel Locking With Deadlock Avoidance", D. B. Lomet, IBM Technical Disclosure Bulletin, vol. 21, No. 4, Sep. 1978.

"Locking Technique In A Relational Data Base–Locking On Intents", K. P. Eswaran, IBM Technical Disclosure Bulletin, vol. 18, No. 7, Dec. 1975.

"Modified Multiple Locking Facility", S. C. Parikh, IBM Technical Disclosure Bulletin, vol. 34, No. 3, Aug. 1991.

"Dynamic Check Count Method For Detection Of Concurrent Data Modification", M. L. Holm and G. R. Ricard, IBM Technical Disclosure Bulletin, vol. 33,6A Nov. 1990.

"Semantically Rich Set Of Seize Types Using The Classical Shared/Exclusive Seize Model", M. L. Holm, G. R. Ricard, and J. J. Vriezen, IBM Technical Disclosure Bulletin, vol. 33, No. 5, Oct., 1990.

"Using Commit Bits To Reduce Locking In Transaction Processing Systems", IBM Technical Disclosure Bulletin, vol. 36, No. 9A, Sep. 1993.

"Multigranularity Locking Divergence Control For Epsilon Serializability", K–L. Wu and P. S. Yu, IBM Technical Disclosure Bulletin, vol. 36, 6B, Jun. 1993.

"Adaptive Lock Escalation/De–Escalation", M. L. Holm and T. O. McKinley, IBM Technical Disclosure Bulletin, vol. 34, No. 8, Jan.; 1992.

*Primary Examiner*—Thomas H. Heckler
*Attorney, Agent, or Firm*—Richard M. Ludwin

[57] ABSTRACT

A locking apparatus for a multicomputer system. The lock apparatus is a two level system wherein local lock managers grant locks on a resource only after they have acquired an appropriate token from a rock control server which is the owner of the resource. The lock control server is passive and has all the control information for a resource it owns. When a local lock manager needs a token in a specified mode for a particular resource, it acquires the token from the lock control server. If there are no conflicting tokens, then the rock control server grants the token. However, if there are conflicting tokens, then the lock control server responds with a list of the local lock managers with conflicting tokens. The requesting lock manager then requests each of the local lock managers with conflicting tokens to give it up and to acknowledge when it has done so. When the acknowledgements have been received, the local lock manager requests the lock control server to update its table and grant the requested token.

20 Claims, 14 Drawing Sheets

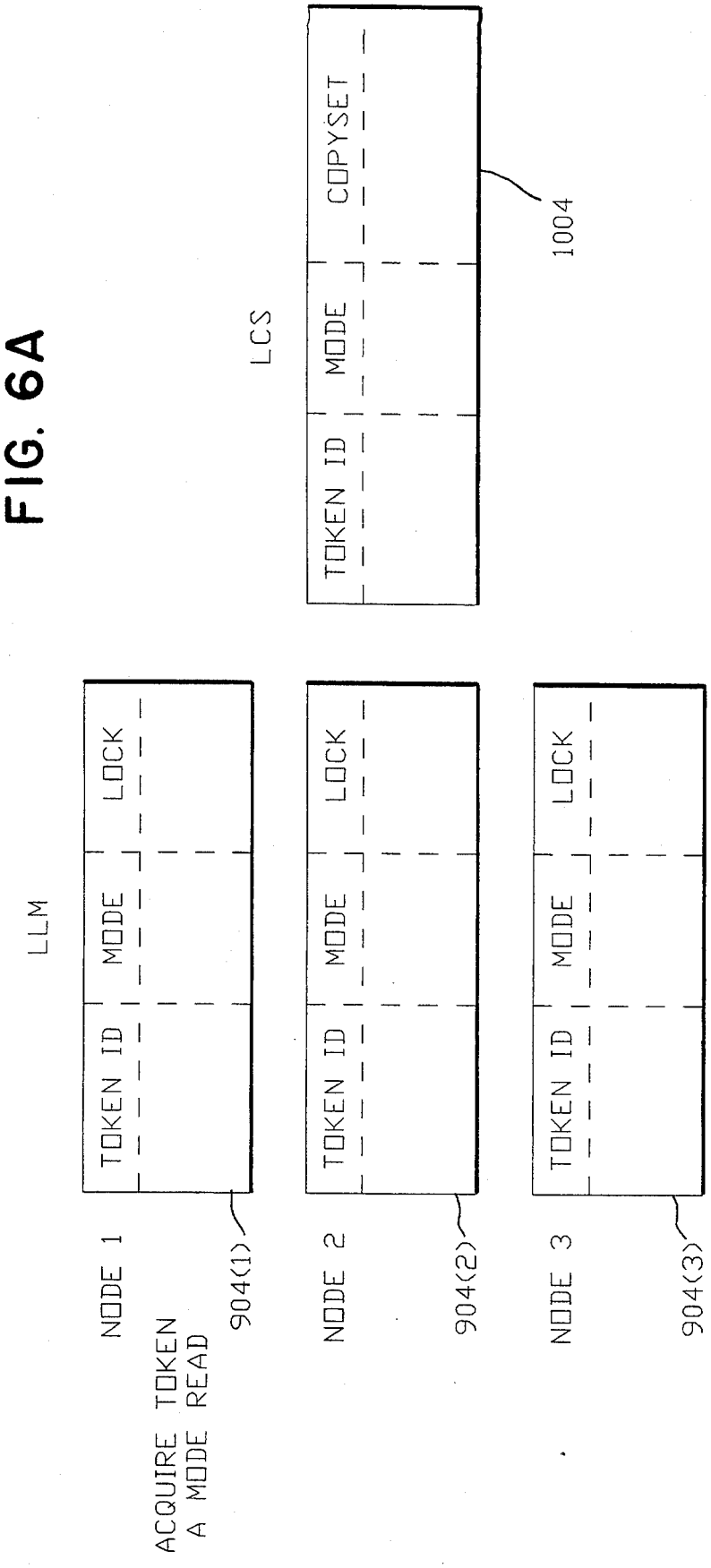

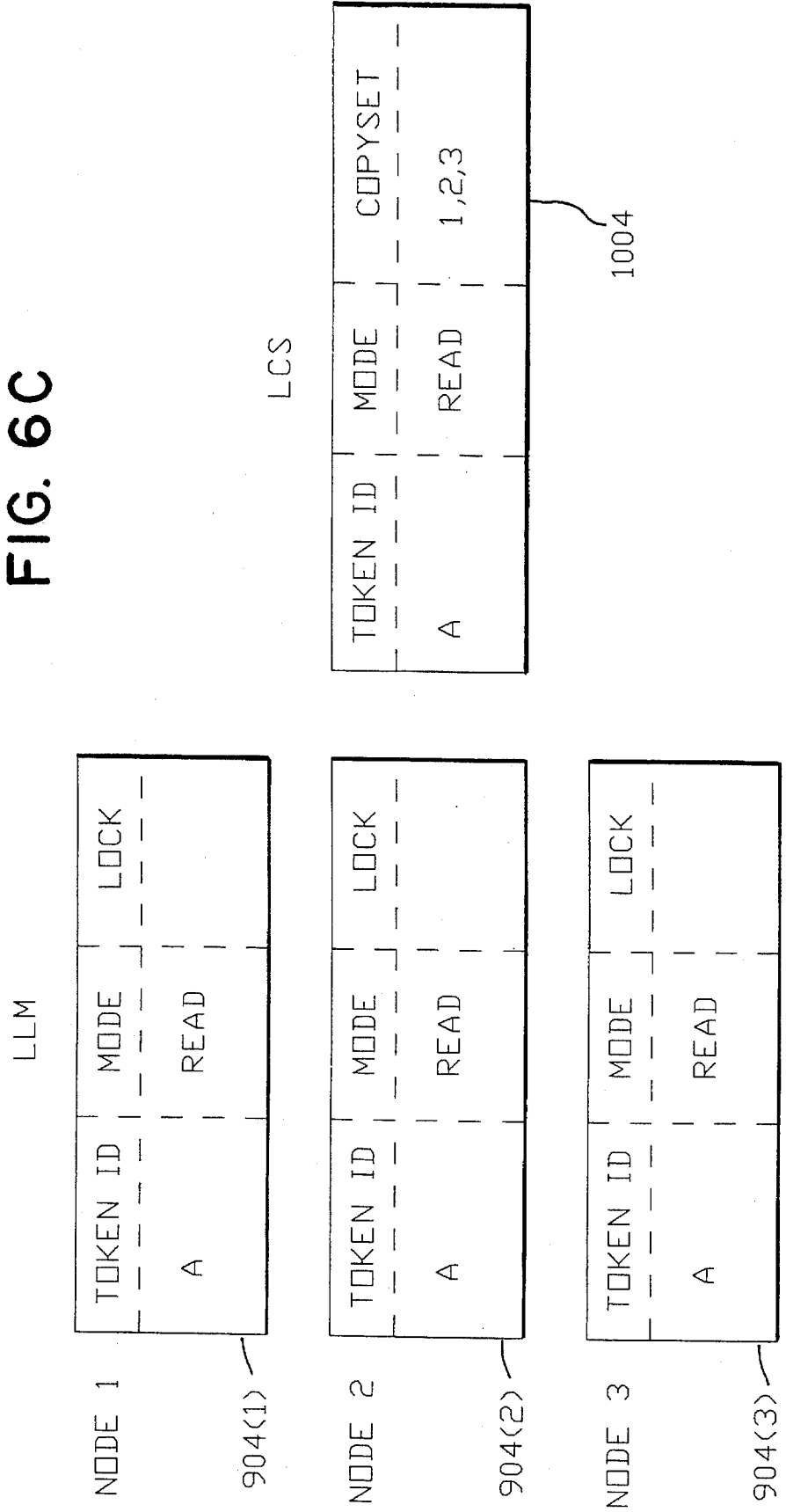

DISTRIBUTED LOCK MANAGER USING A PASSIVE, STATE-FULL CONTROL-SERVER

BACKGROUND OF THE INVENTION

1. Field of the Invention

This invention relates to distributed lock managers for use in multicomputer systems having access to shared files.

2. Related Art

In a closely coupled system, multiple data processing nodes, each under control of its own operating system, are joined by a communications network and have shared files stored on disks. Access to the shared files is coordinated by a set of protocols which are implemented in each of the respective system's software.

One concern in closely coupled systems is properly synchronizing shared file accesses to ensure that conflicts do not occur between tasks. For example, in a banking system, one task may be a customer withdrawing money from his account using an automatic teller machine and another task may be the bank updating the customer's account to process a check. If these tasks are not synchronized, the resulting account balance may be incorrect.

One method of synchronizing tasks in a file sharing environment is known as locking. By this method, a task first obtains access to a data structure known as a lock and then indicates the type of access that is desired in order to either read or modify data in the file, database or other data object that is protected by the lock. Other tasks are then prevented from accessing or given only limited (e.g. read only) access to the protected data until the one task changes the indication of the type of access desired and releases the lock so that other tasks can access it.

Commonly, a global lock manager is provided to resolve lock requests among tasks running on different processors and to maintain queues of tasks awaiting access to particular lock entities. One approach to global lock management is to distribute the locking function among the coupled processors. This method is referred to as distributed lock management. Closely coupled systems having a distributed lock manager are described, for example, in U.S. Pat. No. 5,161,227 to Dias et al. and U.S. Pat. No. 5,226,143 to Baird et al.

In systems having a distributed lock manager, an attempt is typically made to resolve the lock requests from within the processor. Whenever this is not possible, communication with a remote processor is initiated to resolve the lock request.

Distributed locking protocols commonly divide the lock space into multiple partitions which are assigned to respective ones of the coupled processors. Requests for an entity (i.e. a particular lock data structure) are sent to and resolved by the processor which owns the partition to which the entity belongs.

A distributed lock manager requires coordination between nodes to enforce the locking protocol. This coordination is typically achieved by exchanging control messages between the nodes.

SUMMARY OF THE INVENTION

According to an embodiment of the present invention a multicomputer system includes a two level locking system wherein local lock managers grant locks on a file only after they have acquired appropriate lock granting authority (called a "token") from a lock control server (LCS) which is the owner of the file. The lock control server is passive and has all the control information for a file it owns. When a local lock manager (LLM) needs a token in a specified mode for a particular file, it requests the lock control server to grant the token. If there are no conflicting tokens outstanding, then the lock control server grants the requested token. However, if there are conflicting tokens, then the lock control server responds with a list of the local lock managers with conflicting tokens. The requesting local lock manager then requests each of the local lock managers with conflicting tokens to give it up and to acknowledge when it has done so. When the acknowledgements have been received, the requesting local lock manager requests the lock control server to update its table and grant the token.

BRIEF DESCRIPTION OF THE DRAWING

FIGS. 6A–6E depict the changes in the state of the LLM and LCS tables due to a series of tokens requests;

DETAILED DESCRIPTION OF THE PREFERRED EMBODIMENT

The distributed lock manager of the present system is used for serialization of concurrent operations on common data objects between two or more processing nodes using lock and unlock calls. In the preferred embodiment, a lock can be obtained in READ (shared) mode or in WRITE (exclusive) mode. If a lock is unavailable in the required mode, the calling thread of execution is blocked until the lock is available.

Every processing node has its own local lock manager (LLM) which implements the lock and unlock calls. The local lock manager is an inactive entity, but in the following description it is convenient to speak of the node acting as the lock manager in granting locks.

A node grants a READ or WRITE lock only if the node has the lock granting authority, designated by a "token", on the file in the required mode. Therefore, when the first lock call is made on a file, the node must first acquire a token on the file in the required mode. At any given time, either multiple READ tokens or a single WRITE token can be outstanding for a file. For every file, there is an known owner (i.e. every node includes a table which lists all shared files and their owners), and a token is obtained by contacting the owner of the file. When a node contacts the owner, the owner may have given tokens to some other nodes, in which case further arbitration may be necessary to acquire a token.

Figure 1:
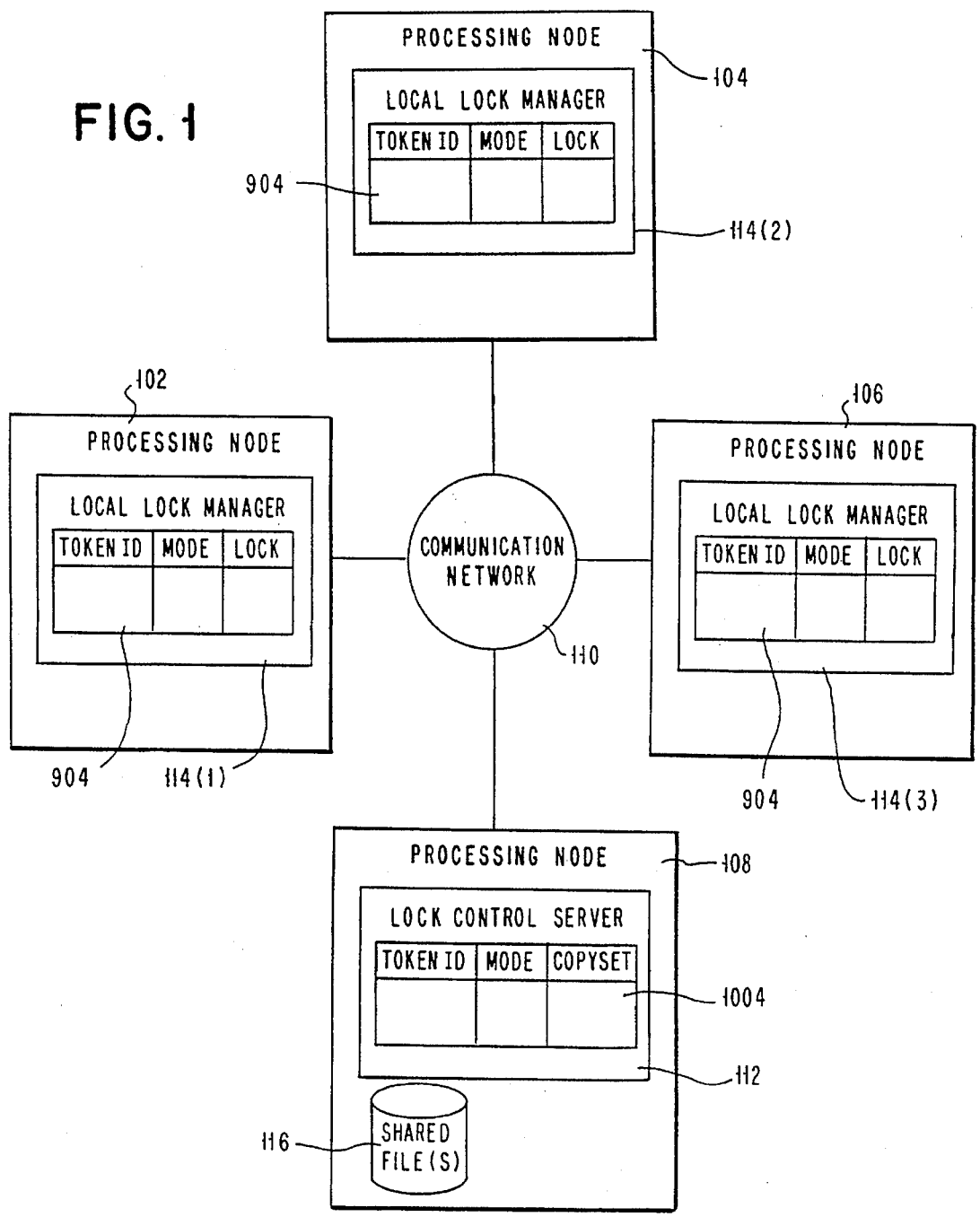
FIG. 1 depicts a closely coupled system suitable for use with the present invention.

A closely coupled system suitable for use with the present invention is illustrated in FIG. 1. The system includes a number of processing nodes (sometimes referred to as nodes) 102–108 interconnected by way of a communication network 110. The systems 102–108 can be embodied, for example, on IBM RISC System/6000 machines using AIX 3.2. The communications protocol can be, for example, SUN Microsystems RPC (remote procedure call), which can run either on UDP or TCP. The network 110 can be of any conventional type, for example a token ring.

According to an embodiment of the present invention, each of the systems 102–108 includes a lock control server 112 and a local lock manager 114. Within each system, the LCS controls access to the shared files 116 that the system owns. The local lock managers 114(1)–114(3) grant locks on a file only after they have acquired appropriate lock granting authority from the lock control manager which is the owner of the file. For purposes of clarity, the LCS and shared file is shown only in one of the systems while LLMs are shown in each of the other systems. It should be understood, however, that one or more sets of shared files, an LLM, and an LCS are present in each of the systems.

The lock control server 112 maintains all of the control information for the resources it owns in a state table 1004. The lock control server is a passive and state-full lock manager. By passive, it is meant that the lock control server does not send any messages to other nodes on its own. By "state full" it is meant that the lock control server maintains the exact state information about the location of the tokens, along with their modes, at all times. The lock control server is provided with enough space in its state table so that it can always hold all information about all outstanding requests. Therefore, the lock control server does not have to initiate any communication because of a shortage of space in its data structure. In the entire protocol, the lock control server only responds to messages but does not initiate communication on its own.

Figure 9:
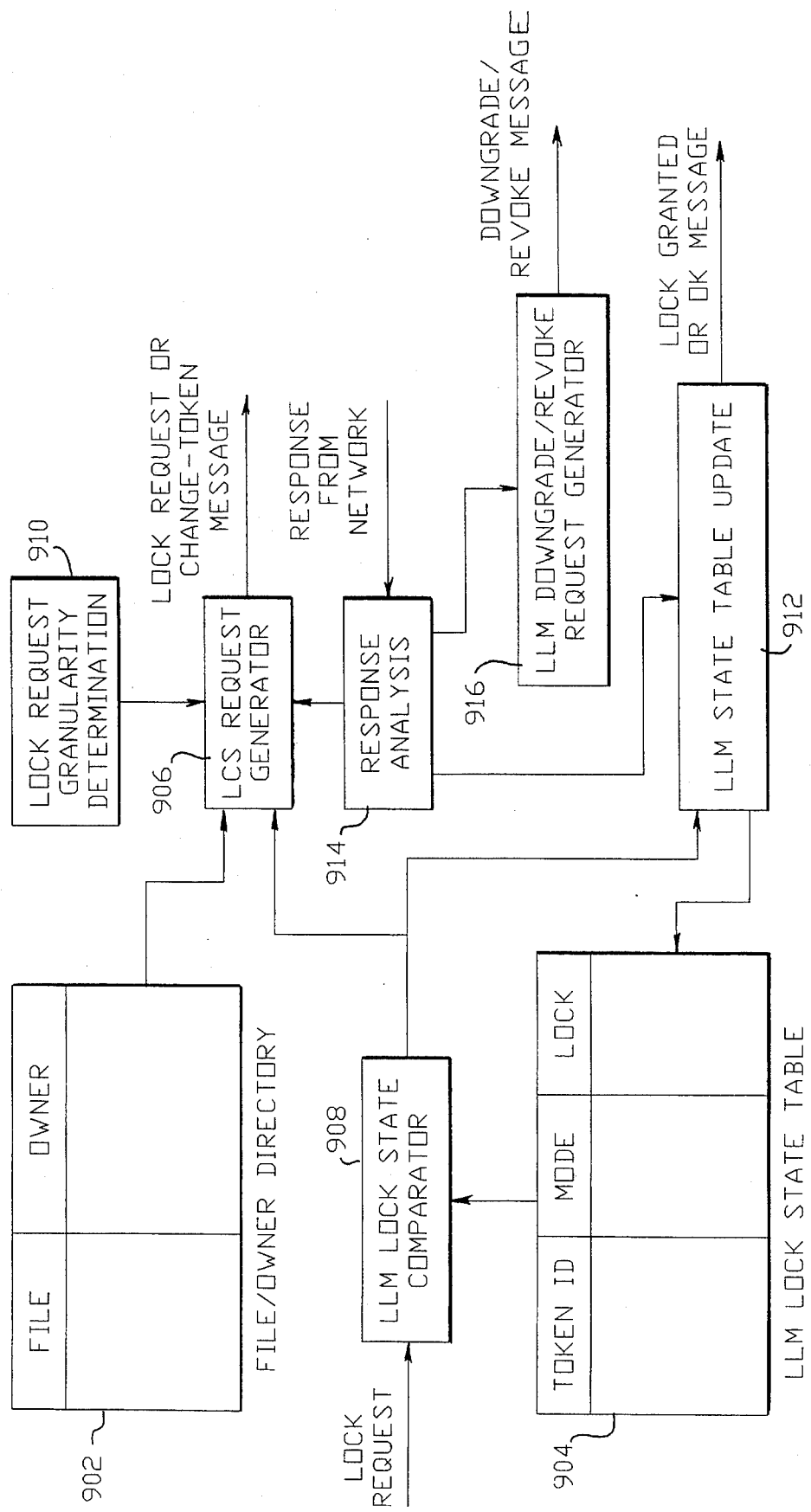
FIG. 9 is a functional block diagram of an LLM.

A functional block diagram of a local lock manager is shown in FIG. 9. Each LLM 114(1)–114(3) includes a file/owner directory 902 and a lock state table 904. Each of these constructs 902, 904 is formed in the processing node's random access memory. The file owner directory 902 includes a list of all shared files in the system and their respective owners. For any file required by an LLM the network address of the owner can be determined by reference to the directory 902.

The lock state table 904 includes an entry for each token known to the LLM. Each entry includes three fields. The token token ID field identifies a token. The mode field indicates the mode (read, write or transition) of the token. The lock bit field indicates whether a process executing on the particular node which includes the LLM has a lock on the file.

The LCS Request Generator 906 forms messages to generate appropriate lock requests on the network. Lock request messages which can be generated by an LLM include ACQUIRE, UPGRADE, GIVEUP and CHANGE-TOKEN. The particular type of message used is selected by the node based on information in the lock state table 904.

A node uses an ACQUIRE control message when it does not have a token for the file in question. A node uses an UPGRADE control message when it has a read token, but needs the write token. The GIVEUP control message is a mechanism for a node to relinquish a token voluntarily. A node may want to do so when, for example, it is short of memory for its local state. In particular, if a node needs to acquire a token on a new file and its local state table is full, then the node gives up the token on one of the other files, thus making room for the new one. Finally, a node uses a CHANGE-TOKEN control message when it wants to change the state of a token at the LCS.

Figure 2:
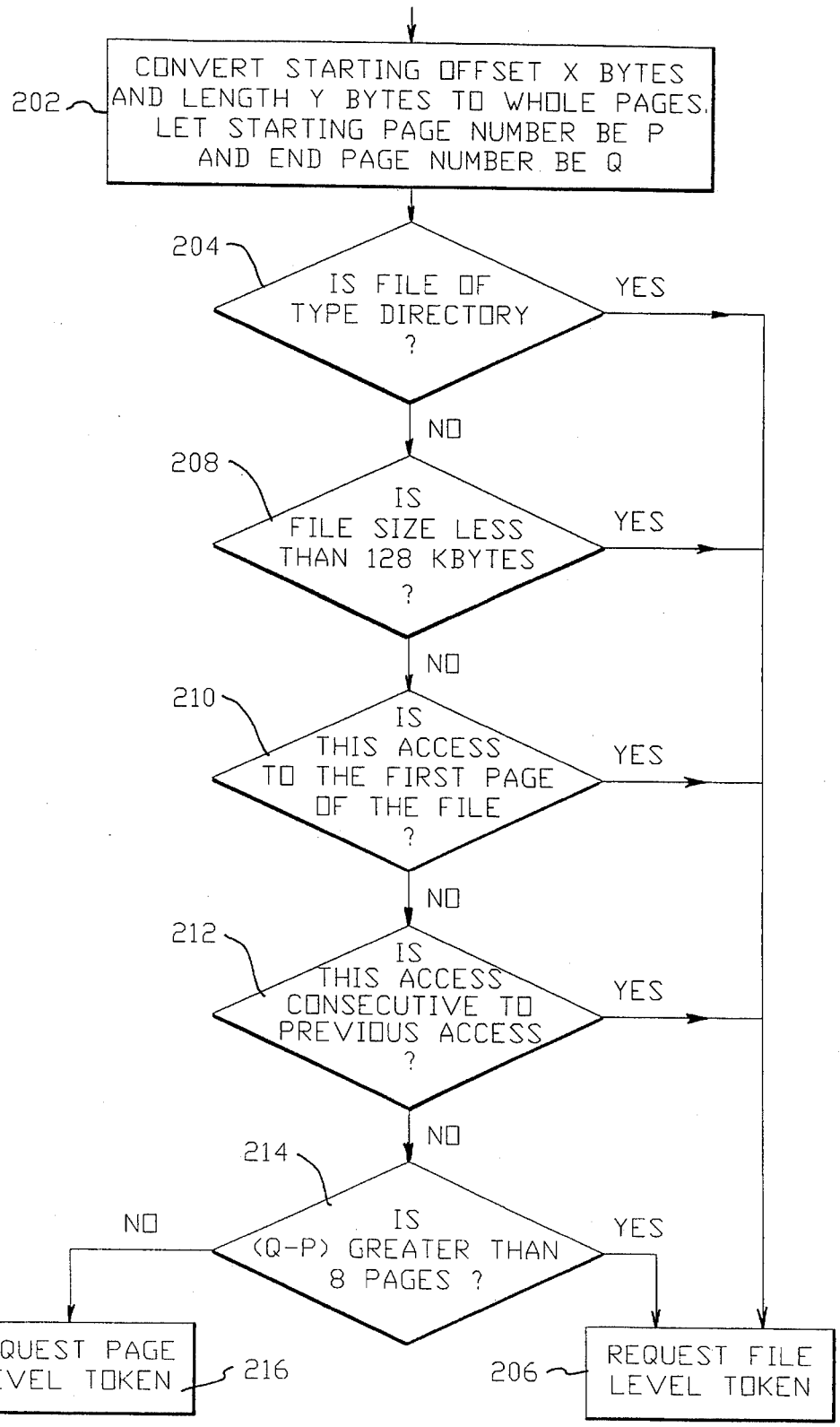
FIG. 2 is a flow chart of the token granularity task in the present system.

The lock granularity determination block 910 determines the proper granularity for the token. When a lock request is received by the LLM, the token granularity determination block 910 determines whether a token covering the entire file or only a portion of the file should be acquired. The determination block 910 signals the LCS request generator 906 accordingly and the LCS request generator generates 906 the request message accordingly. The particular method used by the lock granularity determination block is illustrated in FIG. 2.

The lock state comparator 908 receives lock requests from processes executing on the node. When a lock request is received the lock state comparator scans the lock state table 904 to determine if there is an entry for the requested file and if the requested lock state is compatible with the present lock state. If there is an entry and the lock states are compatible, the lock state comparator 908 signals the state table update block 910, which updates the locks state table accordingly. If not, the lock state comparator signals the LCS request generator 906. The LCS request generator 906, based on the signal from the lock request granularity determination block 910, generates the appropriate lock request and sends it to the LCS.

If there are no conflicting tokens, then the lock control server 112 grants the requested token by responding with an OK message. However, if there are conflicting tokens, then the lock control server 112 responds with a NOT OK message and a list (a "copyset") of the local lock managers with conflicting tokens.

Figure 3:
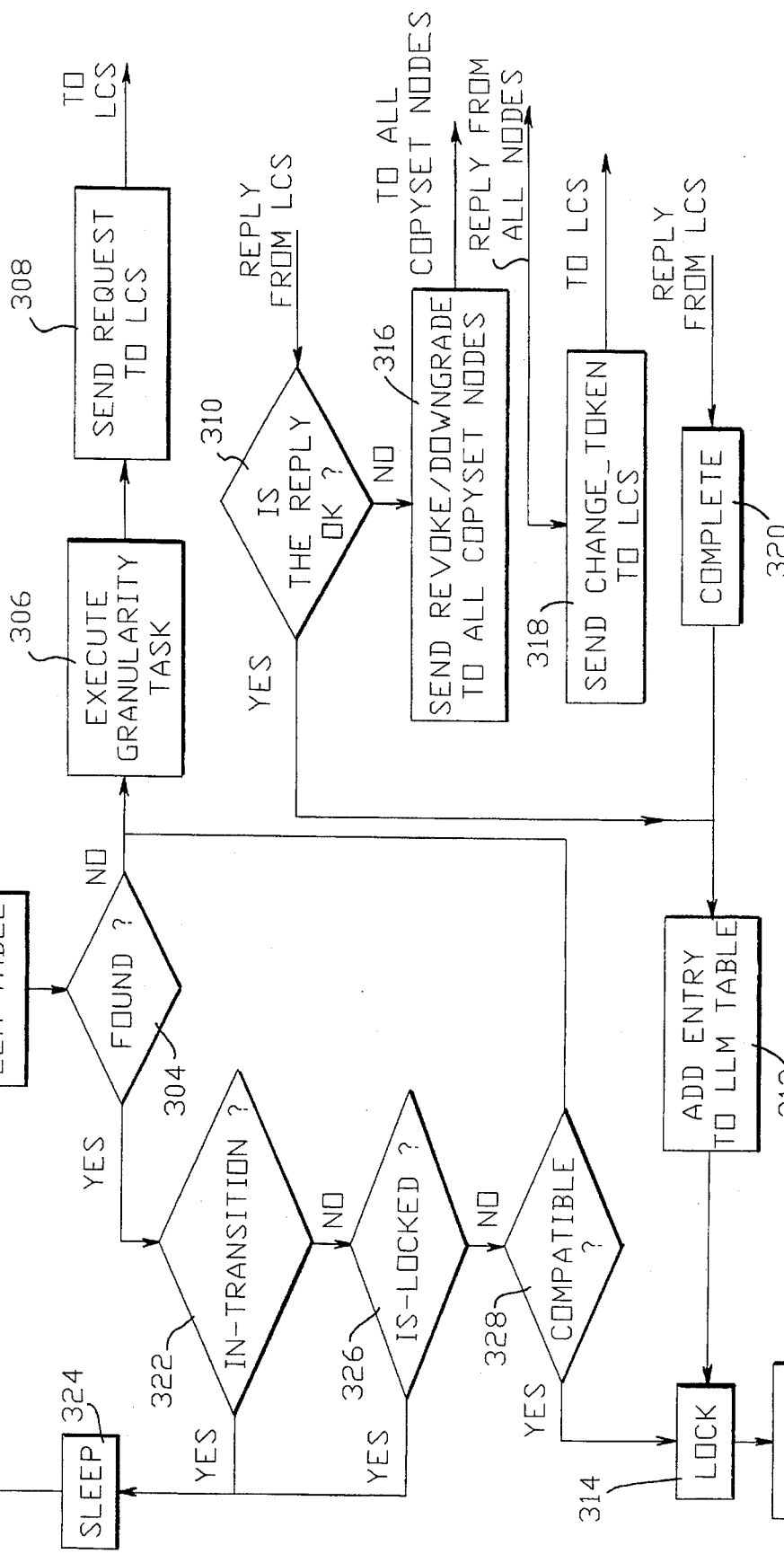
FIG. 3 is a flow chart of the lock request task of a local lock manager in the present system.

The response analysis block 914 receives response messages from the network and analyzes them to determine the appropriate LLM action as illustrated in the flow chart of FIG. 3. If, in response to an ACQUIRE, UPGRADE or CHANGE-TOKEN request, an OK message is received from the LCS, the response analysis block 914 signals the state update table block. The state update table block 912 updates the lock state table and grants the lock. If, in response to an ACQUIRE or UPGRADE request, a NOT OK message is received from the LCS, the response analysis block 914 signals the LLM downgrade/revoke request generator block 916. The LLM downgrade/revoke request generator block 916 sends a revoke/downgrade message to all LLMs in the copyset supplied by the LCS.

If the response analysis block 914 receives an OK message from another LLM, it checks to see if all the LLMs in the copyset have acknowledged. If so, it signals the LCS request generator block 906. The LCS request generator block 906 sends a change token message to the LCS. The response analysis block 914 does not do anything if all LLMs have not yet acknowledged.

If the response analysis block 914 receives a downgrade/revoke message, it signals the state table update block 912. The state table update block 912 updates the lock state table 904 accordingly and sends an OK message to the LLM on the network.

Figure 10:
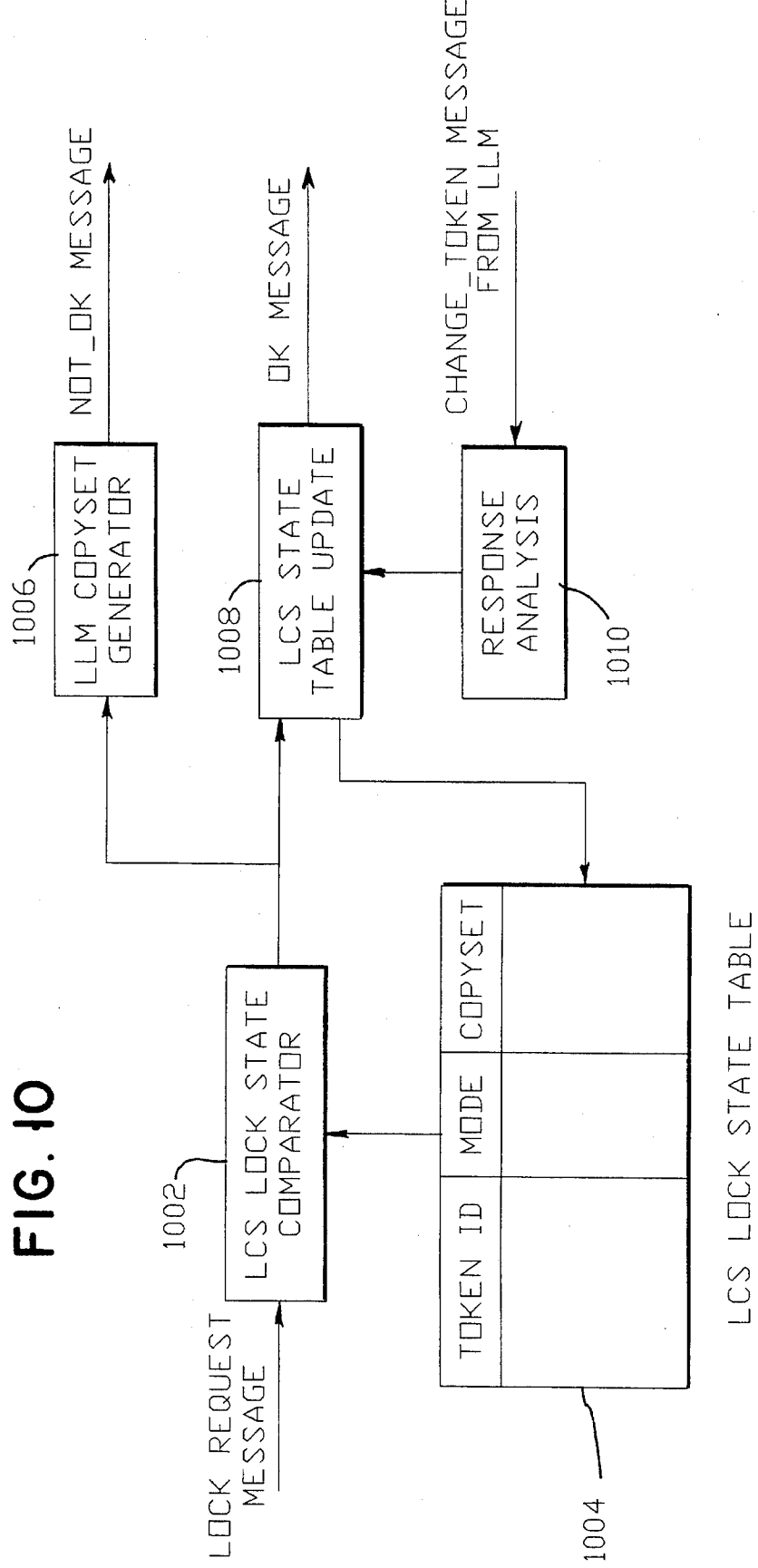
FIG. 10 is a functional block diagram of an LCS.

A functional block diagram of the lock control server 112 is shown in FIG. 10. Each LCS includes a lock state table 1004, which is formed in the processing node's random access memory. Each entry in the local state table 1004 includes three fields. The token ID field identifies a token. The mode field indicates the mode (read, write or transition) of the token. The copyset field contains the list of processing nodes that have been granted the token.

When a lock request message is received by the LCS, the lock state comparator 1002 checks the lock state table 1004 to see if the token can be granted. If the token can be granted then the lock state comparator signals the state table update block 1008, which updates the lock state table accordingly. The state table update block 1008 then sends an OK message to the requesting LLM. If the token cannot be granted, the lock state comparator 1002 signals the LLM copyset generator 1006, which generates a list of processing nodes that have the token in the conflicting mode and sends the list and a NOT OK message to the requesting LLM.

The response analysis block 1010 receives responses from the network (in form of change token messages) and analyzes them. The response analysis block 1010 signals the state table update block 1008, which updates the lock state table accordingly. The state table update block 1008 then sends an OK message to the requesting LLM.

Each of the local lock managers 114(1)–114(3) comprise software tasks which are executed under control of the system's main control program (operating system) and one or more data structures (lock tables) which store the control information for the shared files owned by the system. Specifically, each lock control manager includes two tasks: a granularity task which applies a set of heuristic rules to determine the granularity of a token and a lock management task which makes token requests and manages the lock control protocol for the system.

A flow chart of the token granularity task is illustrated in FIG. 2. In step 202 the LLM converts the starting offset (X bytes) and length (Y bytes) specifying a portion of a file to be accessed to whole pages, wherein the starting page number is P and the end page number is Q. Then in step 204, the LLM determines whether the file is a directory type. (A file is of directory type, if it is used by the system to store the names and internal addresses of other files instead of regular text. A file is designated as a directory type by the system.) If yes, in step 206 the LLM requests a file level token. If not, in step 208 the LLM determines if the file size is less than 128 Kbytes. If yes, the LLM requests a file level token. If not, in step 210 the LLM determines if the start page number is the first page of the file (P=0). If yes, the LLM requests a file level token. If not, in step 212 the LLM determines if the present access is consecutive to the immediately previous access to the file. If yes, the LLM requests a file level token. If not, in step 214 the LLM determines if the total number of pages to be accessed is greater than 8. If yes, the LLM requests a file level token. If not, in step 216 the LLM requests a page level token on each of the pages to be accessed.

A flow chart of the lock management task of a local lock manager is illustrated in FIG. 3. Assume that a requesting process executing on a given node (the requesting node) wants to acquire a lock on a given file A in mode X, where X is read or write. In step 302, the LLM examines its state table 904 to determine if there is an entry for file A. If in step 304, the LLM determines that there is not such an entry, in step 306 the LLM executes the granularity task of FIG. 2 to determine the proper granularity for the token request. Then, in step 308 the LLM sends an ACQUIRE request to the LCS that owns file A and waits for a reply.

Upon receipt of the reply, in step 310 the LLM examines the reply and determines whether the token has been granted (reply is OK). If the token has been granted, the LLM adds an entry to its state table 904 in step 312 (indicating the token mode) and sets the lock bit in step 314. This completes the token acquisition and granting of the lock request. If the token has not been granted (reply is NOT OK), the reply from the LCS contains a copyset of the current token holders. In this case, in step 316 the LLM sends a DOWNGRADE or REVOKE message to the copyset nodes. The LLM sends the DOWNGRADE message if it needs to acquire a read token. The LLM sends a REVOKE message if it needs to acquire a write token.

After receiving acknowledgement (OK message) from all of the copyset nodes, in step 318 the LLM informs the LCS that the token has been downgraded or revoked. In response, the LCS changes the state table 1004 entry for the token to reflect that the requesting LLM is a holder of the token and it is in the requested mode. The LCS then sends an acknowledgement to the requesting LLM.

After receiving the acknowledgement from the LCS in step 320, the LLM adds an entry to its state table 904 in step 312 and sets the lock bit for that entry in step 314. This completes token acquisition and granting of the lock request.

If, in step 304, the token is found in the LLM state table 904, in step 322 the LLM checks the token state (in the mode field) to determine if it is in transition. A token state is in transition if another process is waiting for a response from another LLM as a prerequisite to change the token state. The state table mode field indicates the specific type of transition that the entry is in (e.g. read changing to write, acquiring, etc.). If the token state is in transition, in step 324 the requesting process awaits for the transition state to end.

If the token state is not in transition, in step 326 the LLM determines if the file is locked by another process executing on the same node. This is indicated by the lock bit in the state table entry for the token being set (logical 1). If the token is locked, in step 324 the requesting process waits for the other process to release the lock.

If the lock bit is not set, in step 328 the LLM determines if the token state is compatible with the requested state. For example, if the node has a READ token, this is compatible with a request for a read lock by a process executing on the node. On the other hand, a READ token is not compatible with a request for a write lock. If the token state is compatible with the requested state, in step 314, the LLM sets the lock bit in the LLM state table entry for the file and returns an indication to the requesting process that the resource has been locked. This completes lock granting. If the requested state is incompatible with the token state, the LLM performs steps 306 and 308 as previously described.

When an LLM wants to upgrade a token (i.e. it has a READ token and it wants a WRITE token) it sends an UPGRADE request to the LCS and awaits a reply. Upon receipt of the reply, the LLM checks to see if the token has been upgraded. If the token has been upgraded, the LLM updates the state of the token in its table and thus complete the token upgrade. If the token has not been upgraded, the reply from the LCS contains the copyset of current token holders and in response, the LLM sends a revoke messages to the copyset nodes.

After receiving acknowledgement from the copyset nodes, the LLM informs the LCS that the token has been revoked. In response, the LCS changes the LCS state table entry for the token to reflect that the requesting LLM is the only holder of the token and the token is in the requested mode. The LCS then sends an acknowledgement to the requesting LLM. After receiving an acknowledgement, the LLM updates the state of the token in its own state table 904 and thus completes the token upgrade.

Whenever a token is to be given up by an LLM, the LLM sends a GIVEUP request to the LCS and awaits a reply. In response, the LCS changes its state table to reflect that the requesting LLM does not have the token anymore and sends an acknowledgement. Upon receipt of the acknowledgement, the LLM removes the token entry from its table and thus completes the token give-up.

Figure 4:
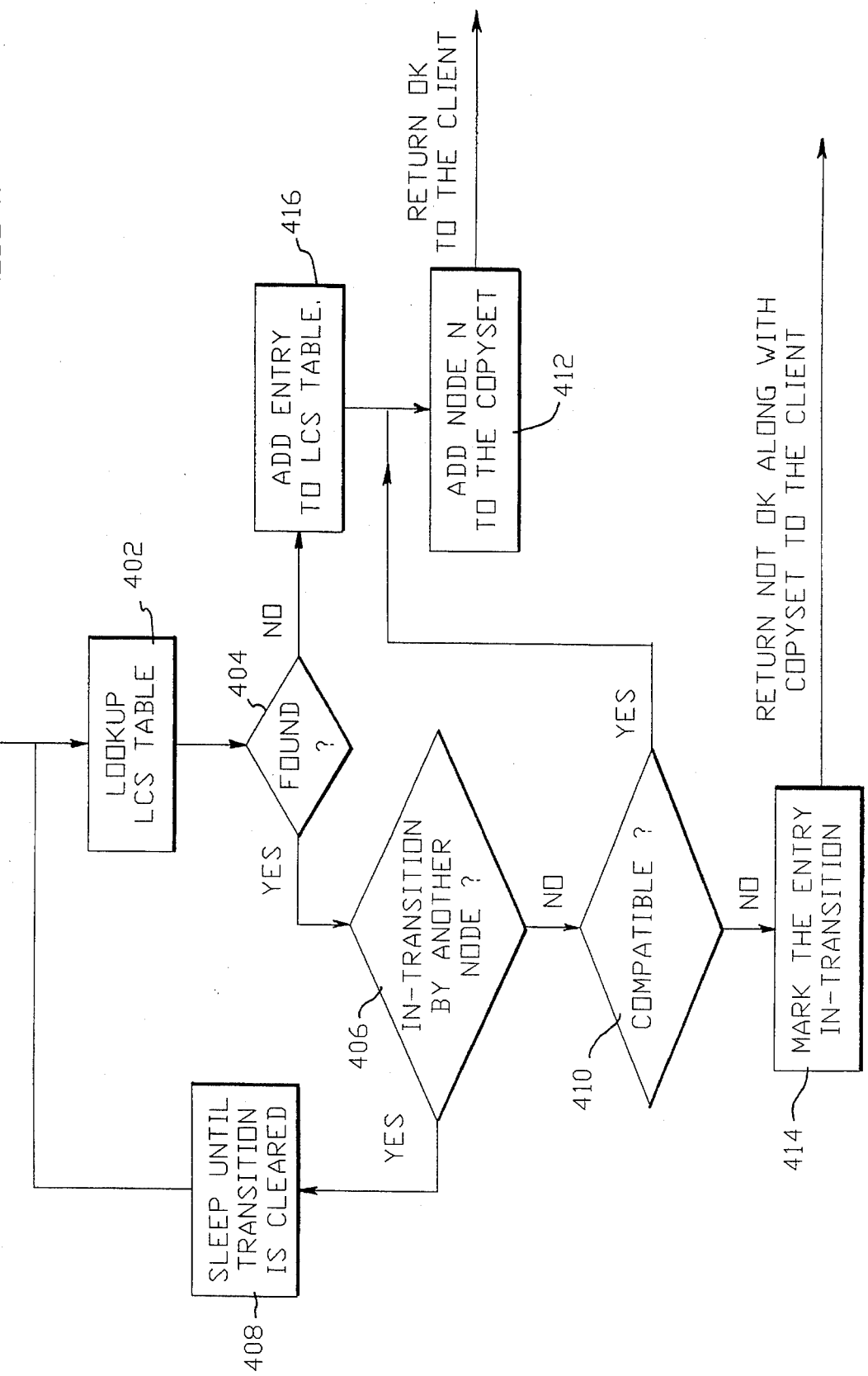
FIG. 4 is a flow chart of the handling of ACQUIRE and UPGRADE requests by an LCS.

A flow chart of the LCS task is illustrated in FIG. 4. When an LCS receives an ACQUIRE or UPGRADE request from an LLM, in step 402 the LCS task looks up the token in the LCS state table 1004. If, in step 404, an entry is found for the token, in step 406 the LCS task checks if the token state has been put in a transition state by another node. If yes, in step 408 this thread of the LCS task sleeps until the transition is cleared. If not, in step 410 the LCS task compares the token state with the requested state to determine if the states are compatible. If yes, in step 412 the LCS task adds the requesting node to the copyset for the token's LCS state table entry and sends an acknowledgement to the requesting LLM. If not, in step 414 the LCS task marks the entry as being in-transition and returns the present copyset to the requesting LLM.

If, in step 404, an entry is not found for the token, in step 416 the LCS task adds an entry (for this token) to its state table, adds the requesting node to the copyset for this entry in step 412 and returns an acknowledgment (OK) message to the requesting LLM to indicate that the token has been granted.

Figure 5:
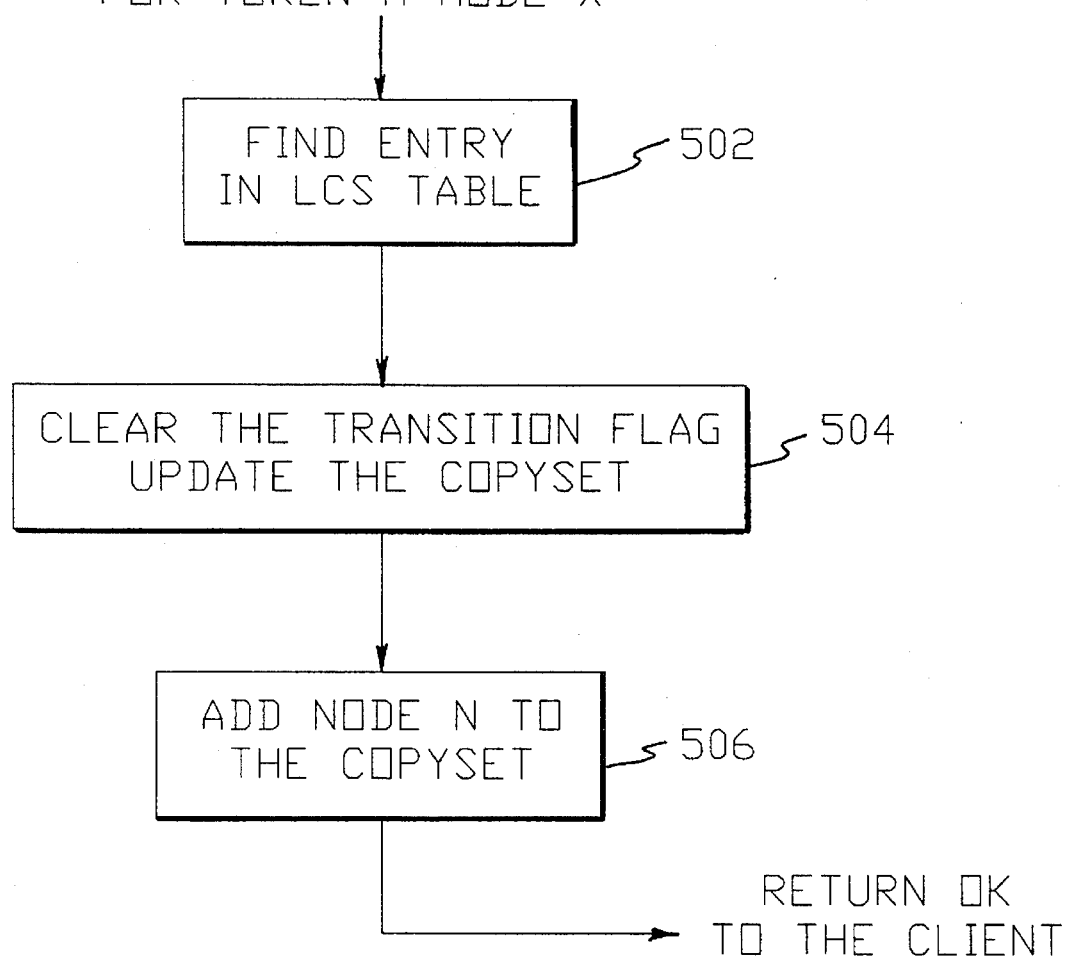
FIG. 5 is a flow chart of the handling of a CHANGE-TOKEN request by an LCS.

FIG. 5 shows the handling of a CHANGE-TOKEN request by an LLM. When such a request is received, in step 502 the LCS task locates the token entry in its LCS table. Then, in step 504 the LCS task clears the transition flag from the mode field and updates the copyset. Next, in step 506, the LCS task adds the requesting node to the copyset and returns an acknowledgement (OK) message to the requesting LLM.

Figure 6B:
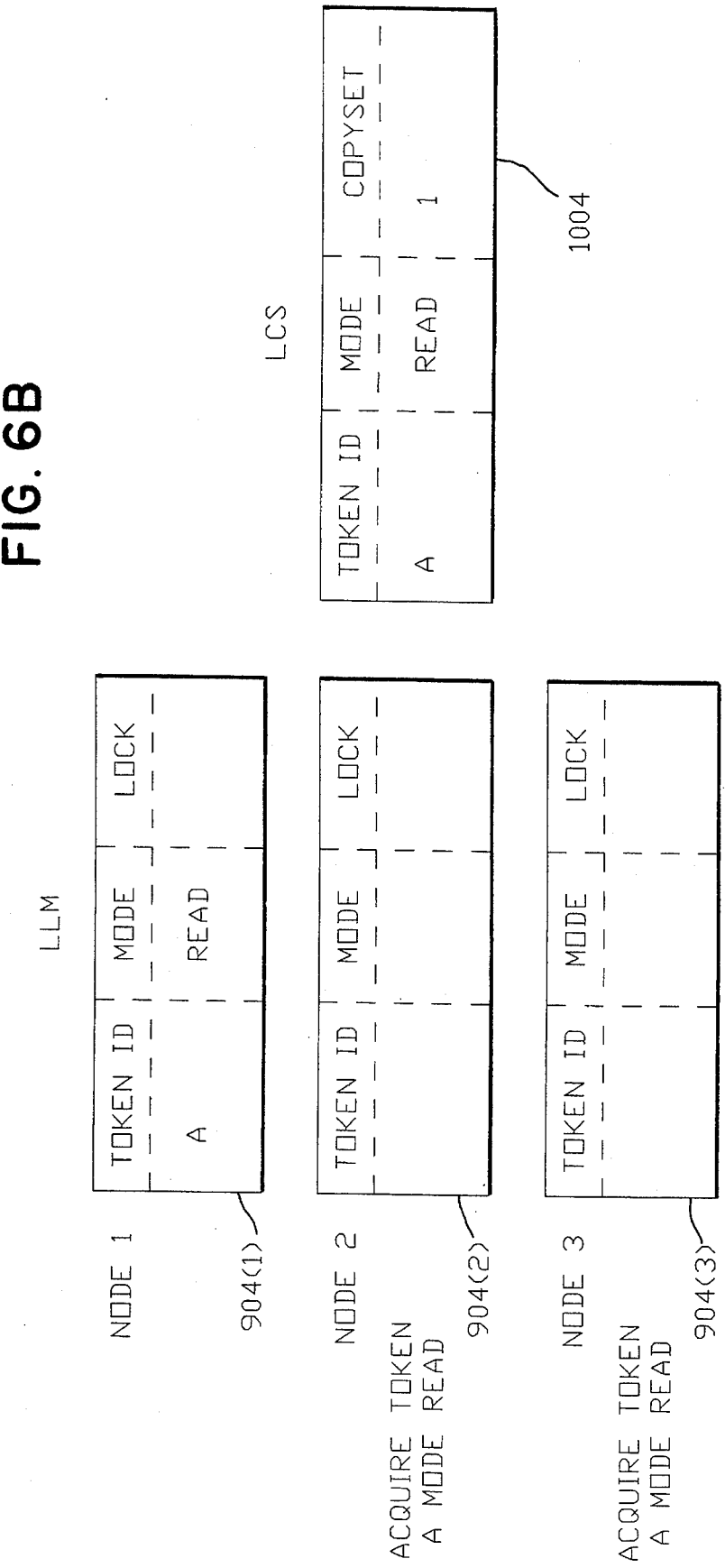

An example illustrating the present system and method will now be described by reference to FIGS. 6A–6E. FIG. 6A shows the initial state. FIGS. 6B–6E depict the changes in the state of the LLM and LCS tables due to a series of tokens requests.

The state change is illustrated for a single token A. Initially, node 1 issues a request to acquire token A in read mode. The request is send to the LCS which then examines its state table to determine if an entry for token A exists. Since no entry exists, the LCS grants the token, updates its state table and sends an OK message as a reply to node 1. Upon receipt of the OK message, node 1 updates its LLM state table 904(1) to indicate that it now has token A in READ mode. This state is shown in FIG. 6B.

Next, nodes 2 and 3 initiate requests to acquire token A in read mode. When these requests reach the LCS it processes the request in the order of receipt. Assuming that the request from node 2 reaches the LCS before the request from node 3, the LCS examines its state table 1004 to determine if an entry for token A exists. As an entry exists, it checks to see if the mode of the new request is compatible with the current mode of the token. In this case, the two modes are compatible (both are READ's). Therefore, the LCS grants the token, updates the copyset for the token entry and sends an OK message as a reply to node 2. Upon receipt of the OK message, node 2 updates its LLM table to indicate that it now has token A in read mode. Next, the LCS processes the request from node 3 and grants token A to node 3. FIG. 6C shows the state of the LLM and LCS tables after the three ACQUIRE token requests have been processed.

Figure 6D:
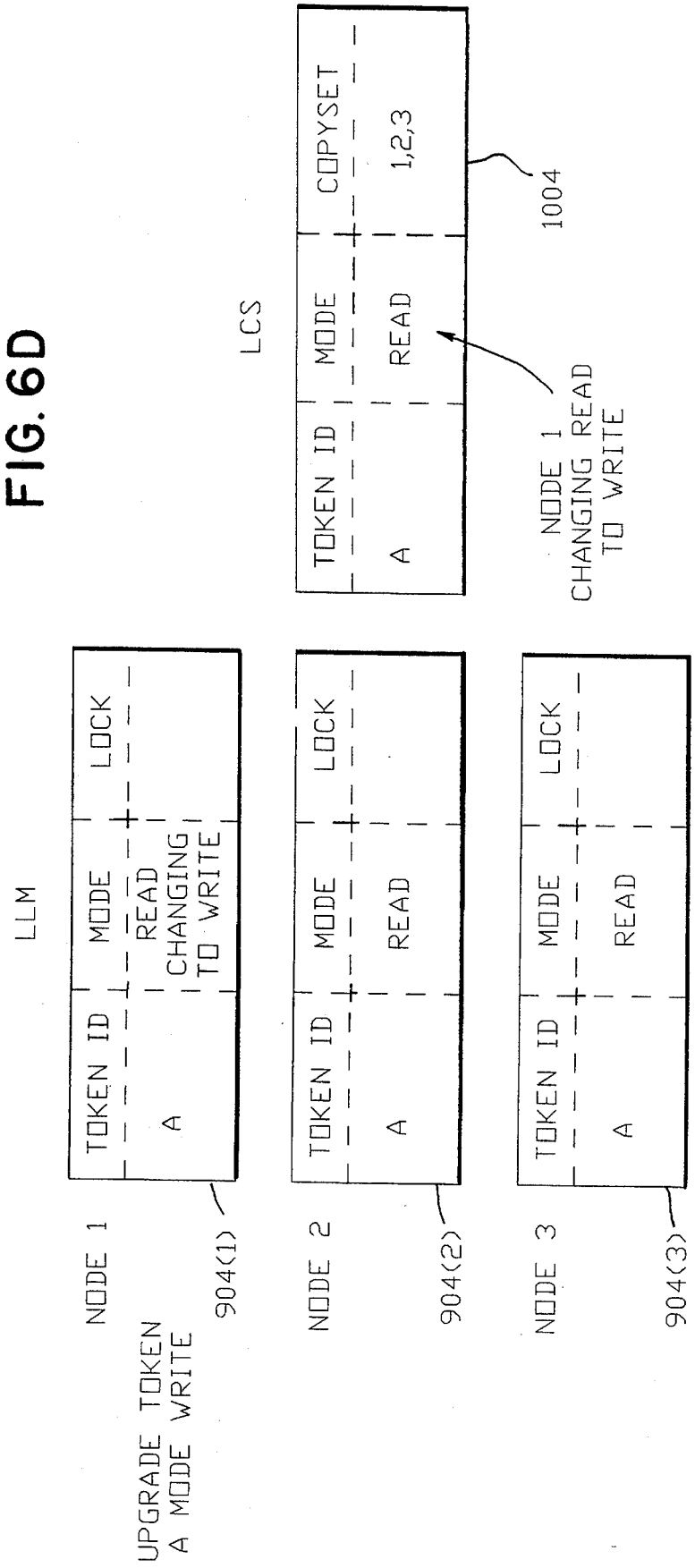
Figure 6E:
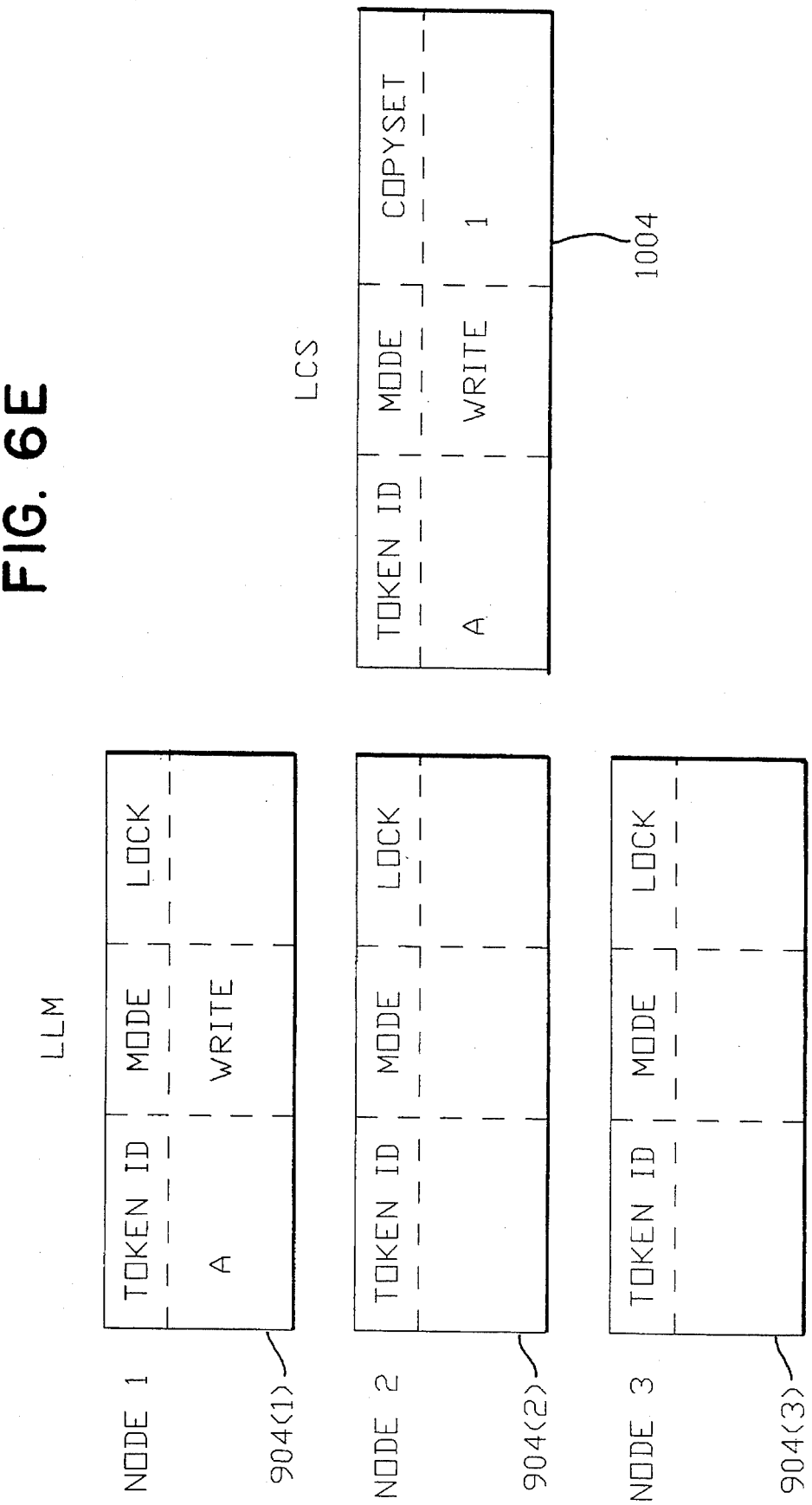

In FIG. 6D, node 1 issues an UPGRADE token request for A. After marking the entry in-transition, node 1 sends the upgrade request to the LCS. The LCS examines its table and determines that nodes 2 and 3 also have outstanding read tokens on A. It marks the token-entry in transition and returns a copyset (consisting of nodes 2 and 3) to node 1. Node 1 sends a REVOKE message to nodes 2 and 3 asking them to give-up token A. Upon receiving a REVOKE request, nodes 2 and 3 delete the token-entry from their LLM table, and send an OK message as a reply to node 1. After receiving the OK message as confirmation from nodes 2 and 3, node 1 sends a message to the LCS indicating that the revokes have been successfully complete. The LCS clears the in-transition flag on the token entry, updates the state of the token and returns an OK message to node 1. Upon receiving the OK message, node 1 clears the in-transition flag on its LLM table entry and updates it. FIG. 6E shows the states LLM and LCS tables at the completion of the upgrade token request.

Figure 7:
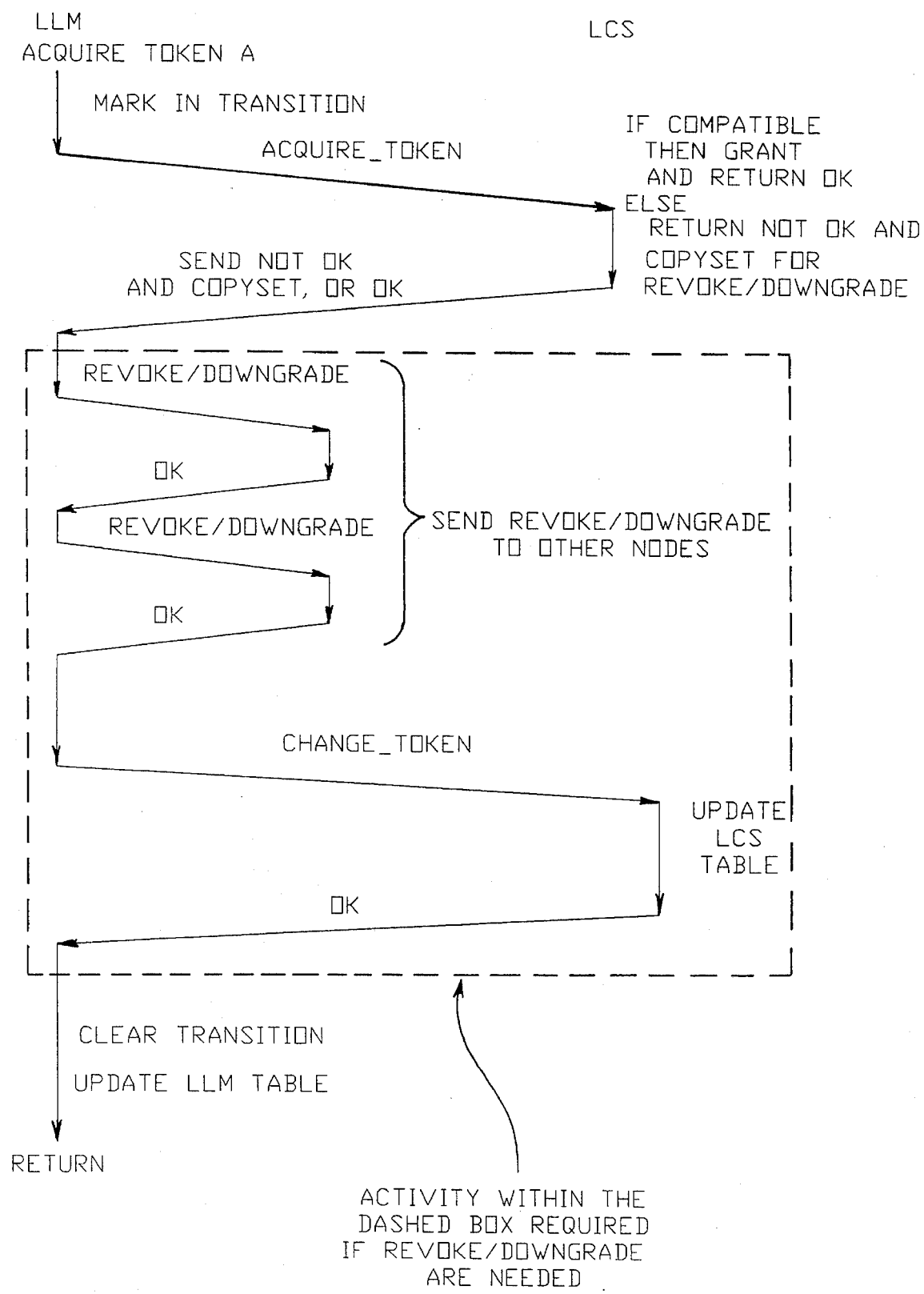
FIG. 7 shows the sequence of message flows among the LLMs and the LCS.

FIG. 7 shows the sequence of message flows among the LLM's and the LCS.

Figure 8:
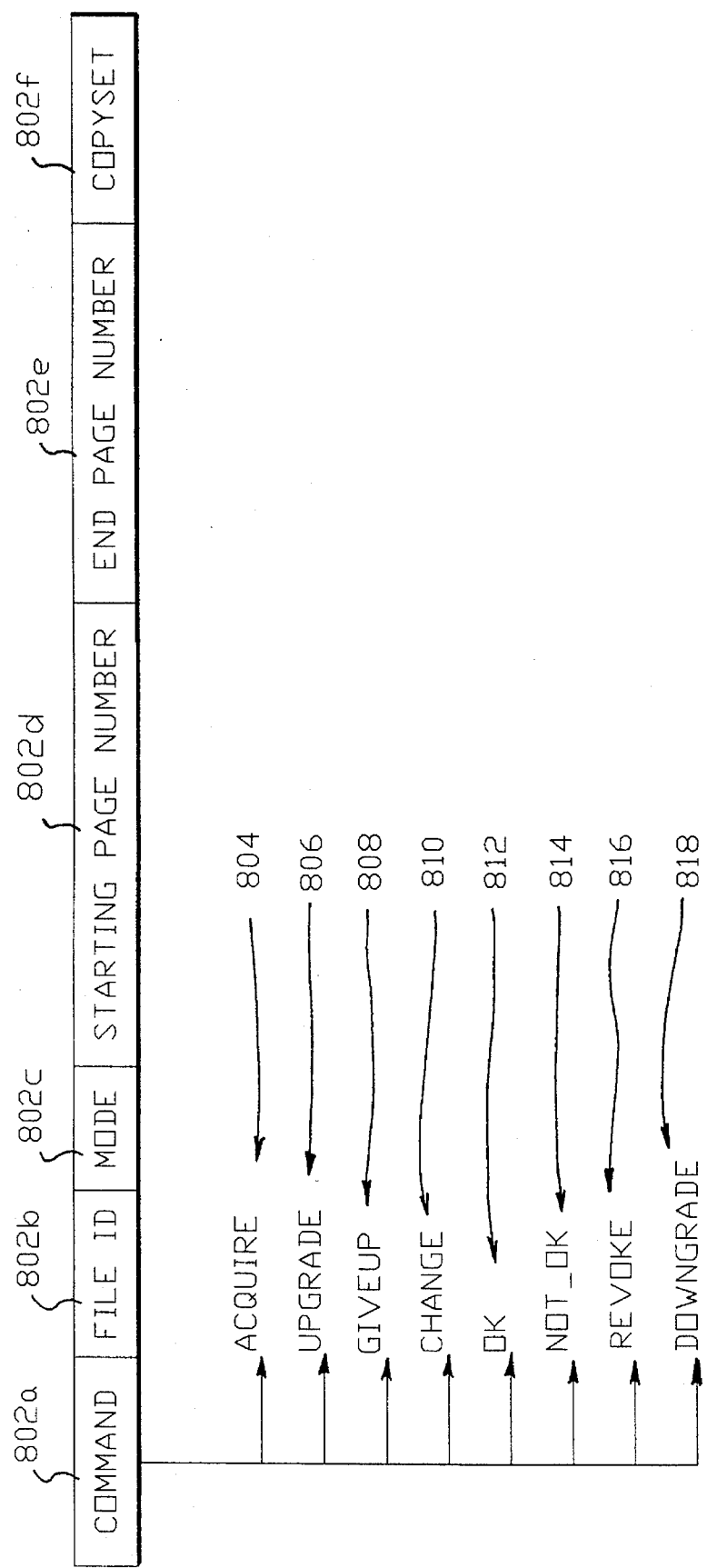
FIG. 8 illustrates message formats in the present system.

Message format in the present system are illustrated in FIG. 8. The message structure consists of the following fields: (1) Command 802a, which identifies the operation to perform at the LLM or LCS; (2) File ID 802b, which identifies the file for which the operation is requested; (3) Mode 802c, if valid, identifies the mode in which the token is requested; (4) Starting page number 802d, if valid, identifies the starting page number in a file for which the token is valid; (5) End page number 802e, if valid, identifies the end page number of the file for which the token is valid; and (6) Copyset 802f, if valid, identifies the LLMs that have the token in a conflicting mode. All messages include the source node address and the destination node address.

The operations which can be specified in the command field 802a include ACQUIRE 804, UPGRADE 806, GIVEUP 808, CHANGE-TOKEN 810, OK 812, NOT OK 814, REVOKE 816 and DOWNGRADE 818.

ACQUIRE 804 is a message from a client to the server indicating that the client wants to obtain a read mode or a write mode token. The message includes a command (in field 802a) that identifies the message as an Acquire request; a File ID (in field 802b) which identifies the file for which the token is requested; a Mode (in field 802c) which identifies which of a read mode or write mode token is requested; and a range (in fields 802d, 802e) which identifies, respectively, the starting (first) page number and the ending (last) page number for which the token is requested in the file identified by the file ID field 802b. The copyset field 802f is unused in this message type.

UPGRADE 806 is a message from a client to the server indicating that the client wants to upgrade its token for a particular file from read mode to write mode. The message includes a command (in field 802a) that identifies the message as an upgrade request; a File ID (in field 802b) which identifies the file for which the token upgrade is requested; and a range (in fields 802d, 802e) which identifies, respectively, the starting (first) page number and the ending (last) page number for which the token upgrade is requested in the file identified by the file ID 802b. The Mode 802c and copyset 802f fields are unused in this message.

GIVEUP (Surrender Token) 808 is a message from a client to the server indicating that the client wants to surrender its token for a particular file or range of pages in a file (i.e. it no longer wants to hold a token on the file). The message includes a command (in field 802a) that identifies the message as a Surrender request; a File ID (in field 802b) which identifies the file on which the surrender is requested; and a range (in fields 802d, 802e) which identifies, respectively, the starting (first) page number and the ending (last) page number for which the token surrender is requested in the file identified by the file ID 802b. The mode field 802c and the copyset field 802f are unused in this message type.

CHANGE-TOKEN 810 is a message from a client to the server indicating that the client has taken some previous action required by the server for a mode change and wants the server to change an entry in the Lock Control Server to reflect the mode change. The message includes a command (in field 802a) that identifies the message as a CHANGE-TOKEN request; a File ID (in field 802b) which identifies the file on which the mode change is requested; a Mode (in field 802c) which indicates the new mode (read or write); a range (in fields 802d, 802e) which identifies, respectively, the starting (first) page number and the ending (last) page number for which the token state change is requested in the file identified by the file ID 802b; and a Copyset (in field 802e) specifying the new copyset for the range of pages (identified in fields 802d and 802e) in the file identified in the File ID field 802b.

OK (Acknowledgment) 812 is message from the first node to the second node, indicating that a request from the first node has been received and granted. The message includes a command (in field 802a) identifying the message as an acknowledge; a File ID (in field 802b) identifying the file for which the request is being acknowledged; a range (in fields 802d and 802e) which identifies, respectively, the starting (first) page number and the ending (last) page number for which the acknowledgement applies in the file identified by the file ID 802b. The mode field 802c and the copyset field 802f are unused in this message type.

NOT OK (Negative Acknowledgment) 814 is message from the server to a client indicating that a request from the client has been not been granted. The message includes a command (in field 802a) that identifies the message as a negative acknowledgment; a File ID (in field 802b) which identifies the file for which the token client request is being denied; a Mode (in field 802c) identifying the current token mode for the pages (specified in range fields 802d, 802e) in the file specified by File ID field 802b; a range (in fields 802d, 802e) which identifies, respectively, the starting (first) page number and the ending (last) page number for which the negative acknowledgment applies in the file identified by the file ID 802b; and a copyset (in field 802f) which identifies which nodes have the token mode specified in the mode field 802c.

REVOKE 816 is a message from a first client to second client requesting that the second client surrender its token for a particular file or range of pages in a file. The message includes a command (in field 802a) that identifies the message as a Revoke request; a File ID (in field 802b) which identifies the file on which the revoke is requested; a Mode (in field 802c) identifying the present mode of the token at the lock control server; and a range (in fields 802d and 802e) which identifies, respectively, the starting (first) page number and the ending (last) page number for which the token revoke is requested in the file identified by the file ID 802b. The copyset field 802f is unused in this message type.

DOWNGRADE 818 is a message from a first client to second client requesting that the second client downgrade its token for a particular file or range of pages in a file from write mode to read mode. The message includes a command (in field 802a) which identifies the message as a Downgrade request; a File ID (in field 802b) which identifies the file on which the downgrade is requested; a Mode (in field 802c) which identifies the present mode of the token at the lock control server; and a range (in fields 802d and 802e) which identifies, respectively, the starting (first) page number and the ending (last) page number for which the token downgrade is requested in the file identified by the file ID 802b. The copyset field 802f is unused in this message type.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

What is claimed is:

1. A locking apparatus for managing access to a shared data resource by a plurality of processes having access to the shared data controlled by two or more data managers executing in a processing complex comprising one or more coupled processors, said apparatus comprising:
   a) a lock control server associated with the shared data resource, said lock control server comprising:
      i) table means to record lock control status of data objects of the shared data resource;
      ii) means responsive to a requested lock on a data object, to report conflicting lock status of the data object;
   b) a plurality of lock managers, each of said lock managers comprising:
      i) means to request that lock control in a specified mode be granted on the data object from the lock control server, and if not granted, to receive a list of the lock managers with conflicting control for the data object;
      ii) means to request of and receive acknowledgement from other lock managers of the giving-up of conflicting control of the data object;
      iii) means to request of the lock control server to update said table means to reflect that this lock manager has lock control in a specified mode for the data object; and,
      iv) means to locally grant locks in a specified mode on the data object after lock control in an appropriate mode for the data object has been acquired from the lock control server.

2. A locking apparatus for use in a multicomputer system wherein multiple data processing nodes, each under control of its own operating system, are joined by a communications network and wherein at least some of the processing nodes control access to shared resources, the locking apparatus comprising:
   a) a lock control server associated with each processing node owning a shared resource, said lock control server comprising:
      i) table means to record lock control status of data objects of the shared resource;
      ii) means responsive to a requested lock on a data object, to report conflicting lock status of the data object;
   b) a plurality of lock managers, each of the lock managers being associated with a node which requires access to a data object whose access is controlled by another node, each of said lock managers comprising:
      i) means to request that lock control in a specified mode be granted on the data object from the lock control server, and if not granted, to receive a list of the lock managers with conflicting control for the data object;

ii) means to request of and receive acknowledgement from other lock managers of the giving-up of conflicting control of the data object;

iii) means to locally grant locks in a specified mode on the data object after lock control in an appropriate mode for the data object has been acquired from the lock control server.

3. The apparatus of claim 2 wherein each node comprises a lock state table, the lock state table comprising an entry for each lock known to the node and each entry including a token ID field which identifies a shared resource which is locked, a mode field which indicates a mode of the lock and a lock bit field which indicates whether a process executing on the node has a lock on the data object.

4. The apparatus of claim 2 further comprising means for locally granting locks, by the node, on the data object whose access is controlled by another node, after lock control for the data object has been acquired.

5. A locking apparatus for use in a client node of a multicomputer system wherein multiple data processing nodes, each under control of its own operating system, are joined by a communications network and wherein at least one of the data processing nodes controls access to a shared resource having a plurality of data objects stored therein, the locking apparatus comprising:

request receiving means, for receiving a lock request on a specified data object from a process executing on the client node;

lock state determination means for determining a present lock state of the data object;

lock comparator means for determining whether the present lock state is compatible with the lock request;

lock request generator means, responsive to a determination by the lock comparator means that the present lock state is incompatible with the requested lock, for sending a message on the network, from the client node to another node which has the lock, requesting that the another node give up the incompatible lock and acknowledge when it has done so; and, update means, for analyzing responses from the network and, responsive to acknowledgement from the another node, for updating the lock state to indicate that the node has the lock on the specified data object.

6. The locking apparatus of claim 5, further comprising:

lock storage means for storing the present lock states of at least some of the data objects not owned by the node; and, wherein, the lock comparator means comprises means, responsive to the lock request, for comparing the requested lock state with the present lock states stored in the lock state storage means and for indicating whether a present lock state, compatible with the data object lock request, is stored in the lock state storage means.

7. The locking apparatus of claim 5, further comprising: a file owner directory coupled to the lock request means, the file owner directory comprising a list of shared resources in the system and their respective owners.

8. In a multicomputer system wherein multiple data processing nodes, each under control of its own operating system, are joined by a communications network and wherein at least one server controls access to a shared resource, a locking method comprising the steps of:

recording, at the server, lock control status of data objects of the shared data resource;

requesting, by a first node, that lock control in a specified mode be granted on a particular data object;

responsive to a requested lock on a data object, reporting by the server, a list of nodes having conflicting lock status of the data object;

responsive to receipt of the list, requesting by the first node that other nodes on the list give up of conflicting control of the data object; and, responsive to acknowledgement from the other nodes that conflicting control has been given up, request by the first node that the server update the lock control status to reflect that the first node has lock control in the particular mode for the data object.

9. The method of claim 8 comprising the further step of: locally granting locks, by the first node, on the data object after lock control for the data object has been acquired.

10. A method for determining granularity of a lock request on a data object shared by two or more processes executing on a least one processor, comprising the steps of:

identifying the particular data object on which a lock is needed;

(a) determining if the data object is a directory type file;

(b) determining if the data object is smaller than a predetermined size;

(c) determining if access is needed to a first page of the data object;

(d) determining if the access is consecutive to a previous access;

(e) determining if the access is to greater than a predetermined number of pages; and, (f) when it is determined that any of steps (a), (b), (c), (d) and (e) are answered in the affirmative, requesting a lock on the entire data object and otherwise requesting the lock on particular pages to be accessed.

11. A system for determining granularity of a lock request on an data object shared by two or more processes executing on a least one processor, comprising:

process means for identifying a particular data object on which a lock is needed;

granularity means, coupled to the means for identifying, for determining a granularity of a lock to be requested; the granularity means determining the granularity responsive to whether the data object is a directory type file; size of the data object; whether access is needed to a first page of the data object; whether access is consecutive to a previous access; and whether access is to greater than a predetermined number of pages; and, lock request means, coupled to the granularity means, for requesting a lock on pages of the data object specified by the granularity means.

12. The system of claim 11 wherein the lock request means comprises:

lock state determination means for determining a present lock state of the data object;

lock comparator means for determining whether the present lock state is compatible with the lock request;

lock request generator means, responsive to a determination by the lock comparator means that the present lock state is incompatible with the requested lock, for sending a message on the network to another node which has the lock, requesting that the another node give up the incompatible lock and acknowledge when it has done so; and, update means, for analyzing responses from the network and, responsive to acknowledgement from the another node, for updating the lock state to indicate that the node has the lock on the specified data object.

13. A system for determining granularity of a lock request on a data object shared by two or more processes executing on at least one processor, comprising:

process means for identifying a particular data object on which a lock is needed;

granularity means, coupled to the process means for determining a granularity of a lock to be requested; the granularity means determining the granularity responsive to a set of heuristic rules applied to at least one attribute of the data object and at least one attribute of a requested access;

lock request means, coupled to the granularity means, for requesting a lock on pages of the data object specified by the granularity means.

14. The system of claim 13 wherein the set of heuristic rules are applied to multiple attributes of the data object and multiple attributes of the requested access.

15. The system of claim 14 wherein the attributes of the requested access include whether access is needed to a first page of the data object; whether access is consecutive to a previous access; and whether access is to greater than a predetermined number of pages.

16. The system of claim 14 wherein the attributes of the data object include whether the data object is a directory type file and size of the data object.

17. In a multicomputer system wherein multiple data processing nodes, each under control of its own operating system, are joined by a communications network and wherein at least one server controls access to a shared resource, a locking method comprising the steps of:

recording, at the server, lock control status of data objects of the shared data resource;

identifying a data object on which a lock is required;

determining a portion of the data object on which to request the lock;

requesting, by a first node, that lock control in a specified mode be granted on the portion of a data object;

responsive to a requested lock on a data object, reporting by the server, a list of nodes having conflicting lock status of the data object;

responsive to receipt of the list, requesting by the first node that other nodes on the list give up conflicting control of the data object; and, responsive to acknowledgement from the other nodes that conflicting control has been given up, request by the first node that the server update the lock control status to reflect that the first node has lock control in the particular mode for the data object.

18. The method of claim 17 wherein the determining comprises the step of applying a set of heuristic rules to attributes of the data object and attributes of a requested access to the data object.

19. The method of claim 18 wherein the applying of the set of heuristic rules comprises the step of determining whether access is needed to a first page of the data object; whether access is consecutive to a previous access; and whether access is to greater than a predetermined number of pages.

20. The method of claim 17 wherein the determining comprises the steps of:

(a) determining if the data object is a directory type file;

(b) determining if the data object is smaller than a predetermined size;

(c) determining if access is needed to a first page of the data object;

(d) determining if the access is consecutive to a previous access;

(e) determining if the access is to greater than a predetermined number of pages; and, (f) when it is determined that any of steps (a), (b), (c), (d) and (e) are answered in the affirmative, requesting a lock on the entire data object and otherwise requesting the lock on particular pages to be accessed.

* * * * *